455-619 AU 233 EX
FIP8106 OR 3,544,794

Dec. 1, 1970 W. T. LYNCH 3,544,794

AVALANCHE PHOTODIODE DETECTION APPARATUS

Filed Aug. 29, 1967

223
664,124

INVENTOR
W. T. LYNCH
BY H W Lockhart
ATTORNEY

United States Patent Office 3,544,794
Patented Dec. 1, 1970

3,544,794

AVALANCHE PHOTODIODE DETECTION APPARATUS

William T. Lynch, Summit, N.J., assignor to Bell Telephone Laboratories, Incorporated, Berkeley Heights, N.J., a corporation of New York Filed Aug. 29, 1967, Ser. No. 664,136
Int. Cl. H01j *39/12;* H01l *15/06;* H04b *9/00*
U.S. Cl. 250—199 3 Claims

ABSTRACT OF THE DISCLOSURE

Alternating current biasing to suppress microplasma effects in avalanche photodiodes may be used even when the signal frequency is greater than the bias frequency; a condition which normally violates the sampling theorem. The sampling theorem requires that the signal be sampled, that is, measured, at least twice during each time interval corresponding to the inverse of the bandwidth. For a wide bandwidth pulse detection system the bandwidth is the equivalent of the maximum frequency.

Figure 1:
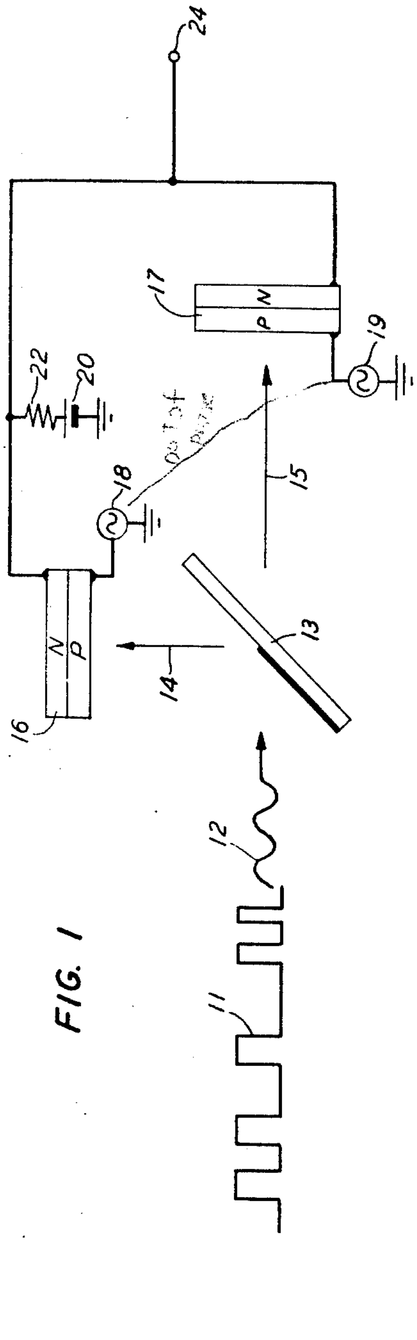

The incoming light beam modulated by the signal frequency is split into two channels each of which is applied to a separate photodiode. The photodiodes then are biased alternately into avalanche breakdown, thus affording not only microplasma suppression but also continuous detection in the avalanche mode and avoiding the restrictions of the sampling theorem.

BACKGROUND OF THE INVENTION

Field of the invention

Recently improved detection of radiant energy has been achieved by the use of avalanche photodiodes. This improvement has particular significance with respect to optical communication systems, typically those using beams of coherent light such as are produced by lasers.

Description of the prior art

More particularly, avalanche photodiode detection has been improved by the use of alternating or cyclically varying bias voltages. As disclosed in U.S. Pat. 3,453,435, ganted to A. Goetzberger on July 1, 1969, a cyclically varying bias voltage suitably chosen with respect to frequency and amplitude is effective in suppressing the deleterious effects of microplasmas. However, when such an arrangement is used with the frequency of the incoming signal to be detected greater than the bias frequency of the photodetector, the basic sampling theorem of modulation theory indicates that some of signal will be lost. The sampling theorem requires the signal be sampled (measured) at least twice during each time interval corresponding to the inverse of the bandwidth. For a wide bandwidth pulse detection system the bandwidth is the equivalent of the maximum frequency. Accordingly, this places a severe limitation on the use of this advantageous mode of operation.

SUMMARY OF THE INVENTION

In accordance with this invention the above-described problem is solved by separating the incoming signal, which is in the form of a beam of radiant energy, into a plurality of beams each of which is applied to a separate photodiode. Each photodiode then is separately biased using a frequency effective to suppress microplasma effects and in a related manner so that at any one time at least one diode is in the avalanche detecting condition. In a basic embodiment the incoming beam may be split into two beams using a half-silvered glass mirror with a photodiode for detecting each of the two beams thus formed. Each diode then is separately biased so that when one is avalanching the other is off and vice versa. Thus, the application of the sampling theorem is avoided inasmuch as detection is afforded continuously.

In the arrangement described above using two diodes each having a multiplication of M, the overall multiplication of the output signal will be, ideally, $M+1/2$. In other embodiments more than two diodes may be utilized to overcome departures from perfect square wave pulse forms in order to avoid significant periods in which detection might not be effective.

In another aspect, some loss of information inherent in the above-described embodiments may be overcome by utilizing optical switching means for shifting the incoming light beam from one photodiode to another in synchronism with the bias frequency.

Figure 3:
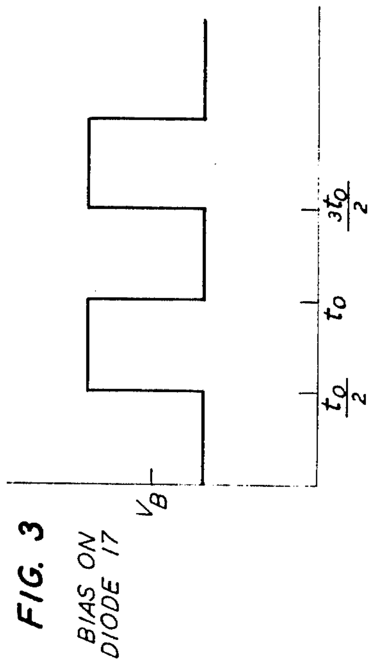
Figure 2:
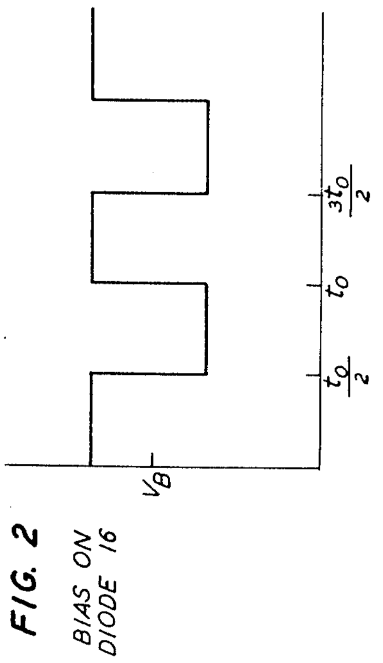

The invention and its objects and features will be more clearly understood from the following detailed description taken in conjunction with the drawing in which FIG. 1 is a schematic representation of a basic embodiment of the invention and FIGS. 2 and 3 are graphs showing the form of the bias voltage applied to the two diodes of the apparatus of FIG. 1.

Referring to FIG. 1, an incoming light beam 12 modulated as by a train of pulses 11 impinges upon the half-silvered mirror 13. At this point, the modulated beam is divided into two separate beams or channels 14 and 15 inasmuch as part is transmitted and part reflected by the beam splitter 13. Each of the divided beams 14 and 15 exhibit the frequency of the incoming beam 12 but have only, ideally, one-half the intensity or amplitude of the original beam 12.

The channel 14 then impinges on photodiode 16 and channel 15 on photodiode 17. Each of these photodiodes 16 and 17 is biased from a direct current potential source 20 through resistor 22 and from alternating current potential sources 18 and 19 respectively. As set forth more fully hereinafter sources 18 and 19 are out of phase.

In accordance with the patent of A. Goetzberger referred to hereinbefore, each diode is biased into avalanche breakdown cyclically so that the time during which the voltage is above the microplasma breakdown voltage is made small compared to the average turn-on time of a microplasma. For example, in the case of a silicon diode of N+P configuration having a bulk breakdown of 25 volts in which there exists a small area microplasma, about $10^{-7}$ square centimeters, having a breakdown voltage of 24 volts, a typical turn-on time for the microplasma would be about 20 nano-seconds when the diode is operated at a peak voltage of 24.5 volts. If such a diode is operated using an alternating current bias which swings from 23.5 volts to 24.5 volts, the average direct current will be substantially constant in value up to about $10^6$ Hz., but will be reduced by a factor of about 10 at about $10^8$ Hz. Accordingly, as taught in that disclosure, the effect is to suppress microplasma current.

As is known in the art, typically, such a silicon diode having an N+P configuration and a bulk breakdown of 25 volts would have a doping level in the P type substrate of $3.5\times10^{16}$ atoms per $cm.^3$ and a circular N+ region, 0.3 micron deep, having a doping level greater than $10^{20}$ atoms per $cm.^3$; the entire circular region being surrounded by a circular junction of higher breakdown voltage, for example, a linear graded junction of less than or equal to $10^{21}$ atoms per $cm.^3$ per cm. Such a graded junction would have a breakdown greater than or equal to 40 volts.

For silicon diodes having higher bulk breakdown values, approximately equal to or greater than 50 volts, the turn-on times are longer and alternating current bias frequencies of about $10^5$ Hz. or less may be used to suppress the effect of microplasmas. This means also that for a given alternating current bias frequency, greater overvoltages above the microplasma breakdown value can be used for high breakdown voltage diodes than for low breakdown voltage diodes. Similar results have been obtained using germanium diodes.

In order that substantially continuous detection be afforded by the photodiodes 16 and 17, the alternating current bias voltage is timed using any of a variety of well-known techniques so that when one diode is "on" the other is "off." Thus, as depicted in the graphs of FIGS. 2 and 3, the bias pulses as applied to diodes 16 and 17 are 180 degrees out of phase. Accordingly, the incoming beam 12 is subjected to continuous detection although at a somewhat, in this particular embodiment, reduced intensity. However, it will be apparent that the frequency of the incoming signal may be higher than the frequency of the bias applied to the diodes without any loss of information. For example, the incoming beam may have a carrier frequency of $5\times10^{14}$ Hz., the signal frequency may be $3\times10^{9}$ Hz. and the bias or sampling frequency may be $2\times10^{8}$ Hz. As these parameters are applied using a silicon diode as described above having a 25 volt bulk breakdown value the peak to peak voltage swing of the alternating current bias may be 1.5 volts and a suitable direct current bias is 24 volts.

In the particular embodiment of FIG. 1, if the multiplication factor of each diode alone in the avalanche condition is M, then the overall multiplication afforded for the recombined output signal will be $M+1/2$, indicating the reduction occasioned by the beam splitting operation. However, some of this reduction may be regained in another arrangement in which means such as birefringent lens replaces the half-silvered mirror 13. The birefringent lens then is arranged so as to produce switching of the input signal beam 12 from one detecting diode to the other in synchronism with the frequency of the alternating bias voltage thus affording substantially continuous detection of essentially the full intensity beam.

Moreover, in another aspect of the invention more than two photodetecting avalanche diodes may be used by arranging optical means to divide or switch the incoming beam to impinge upon each diode. The important feature in accordance with the invention is to afford means whereby at least one diode is in the avalanche mode at all times. This arrangement involving a multiplicity of diodes is particularly advantageous where the alternating current bias voltage pulses depart from the ideal shape and render the apparatus susceptible to having periods between pulses when none of the diodes is avalanching. By utilizing a larger number of diodes, some overlap may be provided in the application of bias voltage to overcome the foregoing problem.

Although the invention has been described in terms of certain specific embodiments, it will be understood that other arrangements may be devised by those skilled in the art which still will fall within the scope and spirit of the invention.

What is claimed is:

1. Signal translating apparatus comprising optical means for dividing a signal beam of radiant energy into at least two channels, detection means for each channel comprising a semiconductor PN junction diode, and voltage means for biasing said diodes successively in reverse to the region of avalanche breakdown at a rate and amplitude so as to substantially inhibit continuous microplasma breakdown, characterized in that at least one of said diodes is in the avalanche breakdown condition at any one time, and means for combining the outut from said diodes into a common output signal.

2. Signal translating apparatus in accordance with claim 1 further characterized in that the frequency of the input signal is greater than the frequency of the voltage biasing the diodes.

3. Signal translating apparatus in accordance with claim 2 in which the optical means comprises a half-silvered mirror for separating the incoming beam into two channels.

References Cited

UNITED STATES PATENTS

| | | | |
|---|---|---|---|
| 3,300,644 | 1/1967 | Zemel | 307—311X |
| 3,415,995 | 12/1968 | Kerr | 250—199 |

ROBERT L. GRIFFIN, Primary Examiner

B. V. SAFOUREK, Assistant Examiner

U.S. Cl. X.R.

250—211